(12) United States Patent
Das et al.

(10) Patent No.: US 7,383,262 B2
(45) Date of Patent: Jun. 3, 2008

(54) RANKING DATABASE QUERY RESULTS USING PROBABILISTIC MODELS FROM INFORMATION RETRIEVAL

(75) Inventors: Gautam Das, Redmond, WA (US); Surajit Chaudhuri, Redmond, WA (US); Vagelis Hristidis, La Jolla, CA (US); Gerhard Weikum, Saarbruecken (DE)

(73) Assignee: Microsoft Corporation, Redmond, CA (US)

( * ) Notice: Subject to any disclaimer, the term of this patent is extended or adjusted under 35 U.S.C. 154(b) by 398 days.

(21) Appl. No.: 10/879,450

(22) Filed: Jun. 29, 2004

(65) Prior Publication Data
US 2005/0289102 A1    Dec. 29, 2005

(51) Int. Cl.
*G06F 7/00* (2006.01)
(52) U.S. Cl. ......................................................... 707/7
(58) Field of Classification Search ...................... 707/3
See application file for complete search history.

(56) References Cited

U.S. PATENT DOCUMENTS

| | | | | |
|---|---|---|---|---|
| 5,625,767 | A * | 4/1997 | Bartell et al. ................ | 345/440 |
| 5,826,260 | A | 10/1998 | Byrd, Jr. et al. | |
| 5,905,980 | A * | 5/1999 | Masuichi et al. ............... | 707/1 |
| 6,006,218 | A | 12/1999 | Breese et al. | |
| 6,185,558 | B1 * | 2/2001 | Bowman et al. ................ | 707/5 |
| 6,546,388 | B1 | 4/2003 | Edlund et al. | |
| 6,654,740 | B2 * | 11/2003 | Tokuda et al. .................. | 707/5 |
| 6,675,159 | B1 * | 1/2004 | Lin et al. ......................... | 707/3 |
| 6,678,690 | B2 | 1/2004 | Kobayashi et al. | |
| 6,693,651 | B2 | 2/2004 | Biebesheimer et al. | |
| 6,701,311 | B2 | 3/2004 | Biebesheimer et al. | |
| 2004/0158560 | A1 * | 8/2004 | Wen et al. ....................... | 707/4 |
| 2005/0071325 | A1 * | 3/2005 | Bem ............................... | 707/3 |

OTHER PUBLICATIONS

Kwok, "A Network Approach to Probabilistic Information Retrieval", ACM Transactions on Information Systems, vol. 13, No. 3, pp. 324-353, Jul. 1995.*
"Sideway Value Algebra for Object-Relational Databases", Ozsoyoglu et al., Proceedings of the 28th VLDB Conference, 2002, pp. 59-70.
"Keyword Searching and Browsing in Databases using BANKS", Bhalotia et al., Proceedings 18th International Conference on Data Engineering, IEEE, 2002, pp. 431-440.
"Two-level document ranking using mutual information in natural language information retrieval", Kang et al., Information Processing & Management, vol. 33, No. 3, 1997, pp. 289-306.
"Topic-Centric Querying of Web Information Resources", Altingovde et al., DEXA, 2001, LNCS 2113, pp. 699-711.
"Approximate Answers using Belief Networks", Ribeiro et al., Proceedings of 16th International Conference of the Chilean Computer Science Society, No. 1996, pp. 31-42.

* cited by examiner

*Primary Examiner*—Tim Vo
*Assistant Examiner*—Aaron Sanders
(74) *Attorney, Agent, or Firm*—Lee & Hayes, PLLC

(57) ABSTRACT

A system and methods rank results of database queries. An automated approach for ranking database query results is disclosed that leverages data and workload statistics and associations. Ranking functions are based upon the principles of probabilistic models from Information Retrieval that are adapted for structured data. The ranking functions are encoded into an intermediate knowledge representation layer. The system is generic, as the ranking functions can be further customized for different applications. Benefits of the disclosed system and methods include the use of adapted probabilistic information retrieval (PIR) techniques that leverage relational/structured data, such as columns, to provide natural groupings of data values. This permits the inference and use of pair-wise associations between data values across columns, which are usually not possible with text data.

27 Claims, 8 Drawing Sheets

Ranking System Architecture

Detailed Ranking System Architecture

FROM BLOCK 516, FIG. 6

↓

─ 518

Enable retrieval of tuples from the database tables through indexes in the database tables:
- enable retrieval of tuples one-by-one in order of decreasing score
- enable retrieval of tuples by random access

↓

─ 520

Calculate a ranking score for each result tuple of a database query result and rank result tuples by:
    - retrieving conditional scores and global scores for each result tuple that contains a query-specified attribute value
    - multiplying the global score and the conditional score to compute final ranking score according to $$Score(t) \propto \prod_{y \in Y} \frac{p(y|W)}{p(y|D)} \prod_{y \in Y} \prod_{x \in X} \frac{p(x|y,W)}{p(x|y,D)}$$

- can use linear scan algorithm to scan result tuples, randomly access tuples from conditional and global lists, compute score for each result tuple that satisfies selection condition of query using information in intermediate layer, and return Top-k tuples
    - can use list merge algorithm to perform a 'get next tuple' operation on conditional and global lists, retrieving tuples one-by-one in order of decreasing conditional and global scores, and execute threshold algorithm to return Top-k tuples as follows:

```
Let G_xb be the shortest list among G_x1,...,G_xs
Let B = {} be a buffer that can hold K tuples ordered by score
Let T be an array of size s+1 storing the last score from each list
Initialize B to empty
REPEAT
  FOR EACH list L in C_x1,...,C_xs, and G_xb DO
     TID = GetNextTID(L)
     Update T with score of TID in L
     Get score of TID from other lists via random access
     IF all lists contain TID THEN
        Compute Score(TID) by multiplying retrieved scores
        Insert <TID, Score(TID)> in the correct position in B
     END IF
  END FOR
UNTIL
   B[K].Score ≥ ∏_{i=1}^{s+1} T[i]
RETURN B
```

*Fig. 7*

RANKING DATABASE QUERY RESULTS USING PROBABILISTIC MODELS FROM INFORMATION RETRIEVAL

TECHNICAL FIELD

The present disclosure relates to ranking database query results, and more particularly, to an automated ranking approach that uses ranking functions based on probabilistic models from Information Retrieval adapted for structured data, and that leverages data and workload statistics and associations.

BACKGROUND

A popular aspect of the query model in Information Retrieval is ranking query results. However, the Boolean query model used in database systems does not support the ranking of query results. For example, a selection query on an SQL database returns all tuples that satisfy the conditions in the query. Furthermore, there are two scenarios that are not handled gracefully by an SQL system. These scenarios are, (a) the Empty-Answers Problem: when the query is too selective, the answer may be empty; and (b) the Many-Answers Problem: when the query is not selective enough, too many tuples may be in the answer. In both cases, it is desirable to rank the database tuples by their degree of "relevance" to the query (though the user may not have explicitly specified how) and return only the top-K matches. The difference in the two scenarios is that in the empty-answers case, the returned tuples only approximately match the query conditions, whereas in the many-answers case they are a subset of the tuples that match the query conditions.

Automated ranking of database query results has beneficial applications, such as for customers browsing product catalogs. Consider, for example, a potential home buyer searching for homes in a realtor, home-search database. The Empty-Answers Problem is illustrated by a very selective query such as "City=Seattle and Price=cheap and Pool=yes and Location=waterfront", which may yield very few or no results. In this case, ranking the query results may not be particularly important. On the other hand, the Many-Answers Problem is illustrated by a query such as "City=Seattle and Location=waterfront". This query is not very selective and may yield too many tuples in the results. Accordingly, a query model that could rank the database tuples by their degree of "relevance" to the query and return only the top-K matches would provide significant benefit. Currently, however, there are no query models available for structured databases that adequately address the Many-Answers Problem.

Ranking functions have been investigated in areas outside database research, such as in Information Retrieval (IR). The vector space model and probabilistic information retrieval (PIR) models are very successful in practice. However, such models are adapted for retrieving information in text data environments and do not necessarily benefit a structured data environment such as a database. The structured data environment of a database includes, for example, columns that signify groupings of attribute values, something which is not available in text data. Additionally, most ranking functions in Information Retrieval assume some form of independence between data values, because deriving associations/dependencies between data values is notoriously hard due to the huge size of the term space in text data. Ranking is also an important component in collaborative filtering research.

Previous database research includes some work on the automatic extraction of similarity/ranking functions from a database. Early work considered vague/imprecise similarity-based querying of databases. There have also been various methods proposed for integrating databases and information retrieval systems. Some prior methods employ relevance-feedback techniques for learning similarity in multimedia and relational databases. Other methods use keyword-based retrieval system over databases. However, previous methods have various disadvantages including, for example, the use of training data using queries requiring user attention, employing ad-hoc techniques loosely based on the vector-space model, and a failure to account for associations and dependencies between data values that exist in structured data environments.

Accordingly, a need exists for an improved way to rank database query results that takes advantage of probabilistic information retrieval (PIR) and accounts for associations and dependencies between data values that exist in structured data environments.

SUMMARY

A system and methods rank the results of database queries. An atomic probabilities module in a pre-processing component analyzes database and workload information and computes "atomic" quantities that describe both the "global" importance of data attribute values and the "conditional" importance of associations between pairs of attribute values within the database and workload. The atomic quantities are encoded into atomic probability tables in an intermediate knowledge representation layer. The atomic quantities can then be used to compute a ranking function for ranking the result tuples of a database query.

An index module in the pre-processing component builds ordered lists of tuples that enable efficient query processing for ranking query result tuples. For every distinct attribute value x in the database, the index module creates a conditional list and a global list of tuple-ids for all data tuples that contain x. Tuples are ordered in the conditional list by descending conditional scores that are calculated from conditional atomic values in the intermediate layer. Tuples are ordered in the global list by descending global scores that are calculated from global atomic values in the intermediate layer.

In one embodiment, the ranking function is derived from a naïve query processing "scan" algorithm in a query processing component. Sores for tuples can be "calculated from scratch" by retrieving the relevant atomic probabilities from the intermediate layer and composing them appropriately. The scan algorithm scans the result tuples of a database query, computes the score for each tuple that satisfies the selection condition of the query using information in the intermediate layer, and returns the Top-K tuples.

In another embodiment, the ranking function is derived from a ranking formula that calculates a ranking score for each query result tuple based on the conditional score for the result tuple and the global score for the result tuple. A list merge algorithm retrieves and multiplies the scores of tuples in the conditional and global lists. This requires fewer multiplications than the scan algorithm, and, since the lists are kept in sorted order of their scores, it enables the employment of a known top-K algorithm (called TA) that is more efficient than a linear scan to retrieve the best matches.

BRIEF DESCRIPTION OF THE DRAWINGS

The same reference numerals are used throughout the drawings to reference like components and features.

FIG. 7 is a continuation of the flow diagram of FIG. 6 illustrating exemplary methods for ranking database query results.

DETAILED DESCRIPTION

Introduction

The following discussion is directed to a system and methods that rank results of database queries. An automated approach for ranking database query results is disclosed that leverages data and workload statistics and associations. Ranking functions are based upon the principles of probabilistic models from Information Retrieval that are adapted for structured data. The ranking functions are encoded into an intermediate knowledge representation layer. The system is generic, as the ranking functions can be further customized for different applications. Benefits of the disclosed system and methods include the use of adapted probabilistic information retrieval (PIR) techniques that leverage relational/structured data, such as columns, to provide natural groupings of data values. This permits the inference and use of pair-wise associations between data values across columns, which are usually not possible with text data.

The primary context of this discussion regards the Many-Answers Problem as introduced above. Any ranking function for the Many-Answers Problem has to look beyond the attributes specified in the query, because all answer tuples satisfy the specified conditions. Investigating unspecified attributes is particularly tricky, however, since the user's preferences for these unspecified attributes need to be determined. This discussion details the ranking of a tuple based on two factors: (a) a global score which captures the global importance of the unspecified attribute values, and (b) a conditional score which captures dependencies/associations between unspecified and specified attribute values. For example, for the query "City=Seattle and Location=waterfront", a home that is also located in a "SchoolDistrict=excellent" gets a high rank because good school districts are globally desirable. A home that also has "BoatDock=available" gets a high rank because people desiring a waterfront location are likely to want a boat dock as well.

One challenge addressed herein is that of converting such intuitions into a principled and quantitatively describable ranking function. In short, this is accomplished with ranking functions based primarily on Probabilistic Information Retrieval (PIR) techniques, with some important adaptations introduced to leverage the relational/structured nature of data in a database. Adapted PIR techniques leverage the fact that columns represent natural groupings of data values. This allows an inference and use of pair-wise associations between data values across columns, which is usually not possible with text data.

Figure 1:
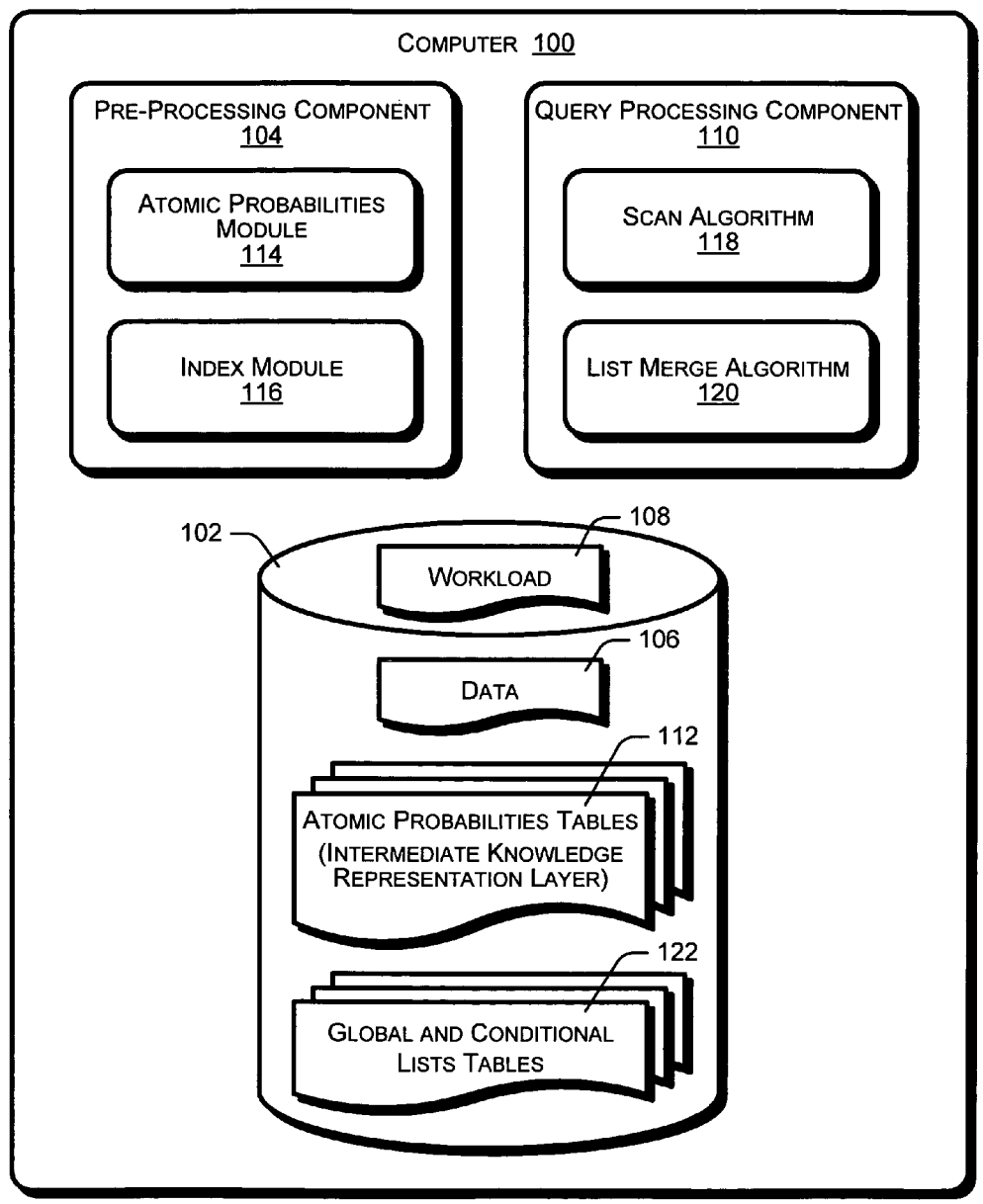
FIG. 1 illustrates an exemplary environment suitable for implementing an automated ranking system for ranking results of database queries.
Figure 2:
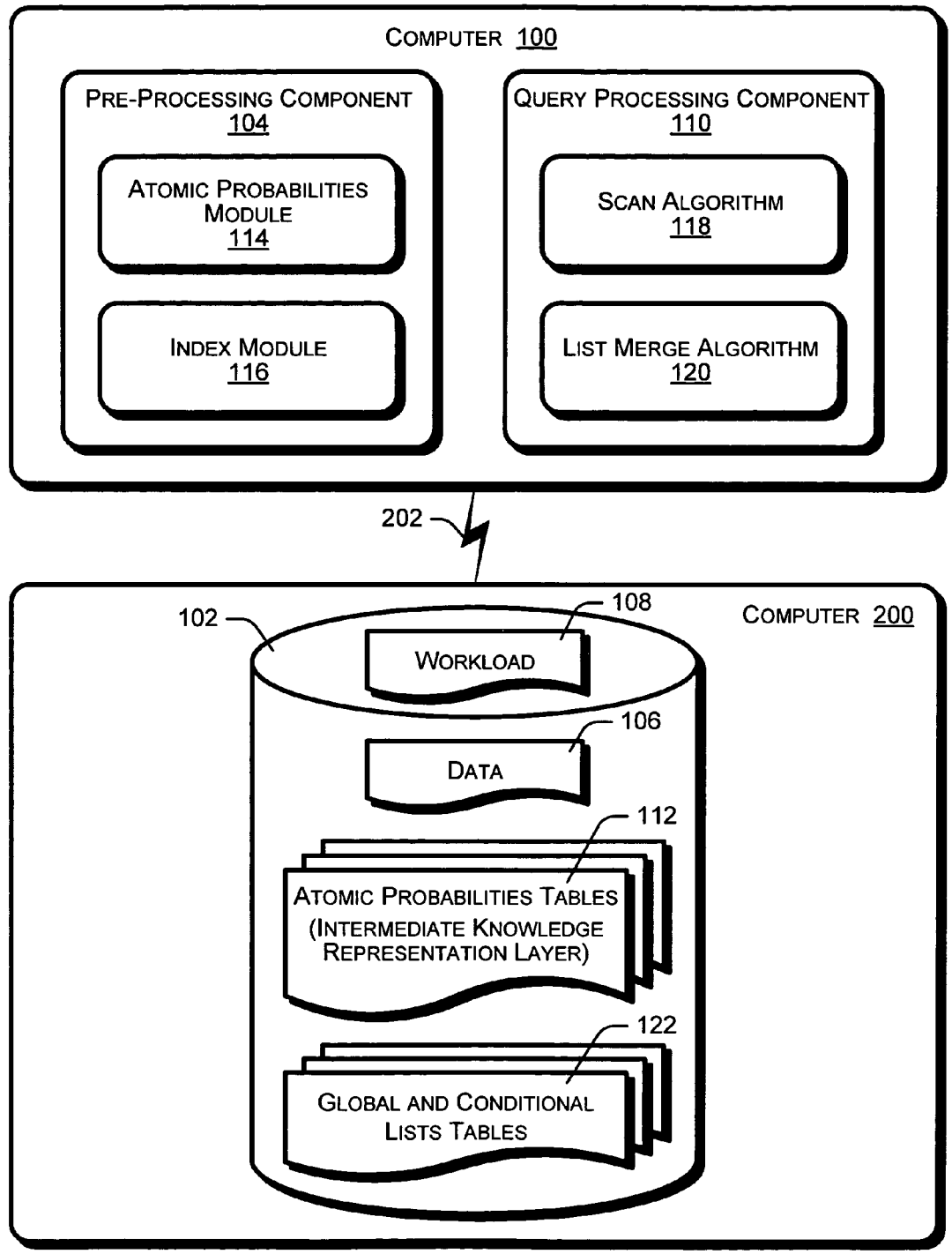
FIG. 2 illustrates another exemplary environment suitable for implementing an automated ranking system for ranking results of database queries.

FIGS. 1 and 2 illustrate an exemplary computer 100 that includes components of an automated ranking system that facilitates ranking results of queries made against a database 102. In FIG. 1, the database 102 is shown as part of computer 100, while in FIG. 2, the database 102 is shown as part of a remote computer 200. FIG. 2 is intended to indicate that the database 102 against which queries are made does not necessarily have to reside on the computer on which the ranking system components reside, such as is shown in FIG. 1. Thus, computer 100 may have access to a database 102 located on a remote computer 200 through a network 202. A network 202 may include both local and remote connections such as, for example, any one or a combination of a modem, a cable modem, a LAN (local area network), a WAN (wide area network), an intranet, the Internet, or any other suitable communication link.

Computers 100 and 200 may be implemented as various computing devices such as, for example, personal computers, server computers, thin clients, thick clients, hand-held or laptop computer devices, multiprocessor systems, microprocessor-based systems, network PCs, minicomputers, mainframe computers, distributed computing environments that include any of the above systems or devices, and the like. In addition to performing the ranking functions as described herein, computer 100 is also typically capable of performing common computing functions, such as email, calendaring, task organization, word processing, Web browsing, and so on. In the described embodiments, computer 100 runs an open platform operating system, such as the Windows® brand operating systems from Microsoft®. One exemplary implementation of both computers 100 and 200 is described in greater detail below in the exemplary computing environment with reference to FIG. 8.

A ranking system of computer 100 includes a pre-processing component 104 that analyzes the database data 106 as well as workload information 108 to determine the appropriate ranking function that is later used by a query processing component 110. The use of the workload 108 is a low cost automated alternative to the tedious process of getting user feedback in the ranking process. Workload 108 is a collection of prior ranking queries that have been executed on the system. The workload 108 is represented as a set of "tuples", where each tuple represents a query and contains the corresponding values of the attributes specified in the query. In general, the pre-processing component 104 mines for pair-wise associations between values in both the database data 106 as well as the workload 108.

Although the baseline system is completely automated, the architecture is modular and generic, which allows for easy customization of ranking for different applications. In addition to the pre-processing 104 and query processing 110 components, another main component is an intermediate knowledge representation layer 112 in which the ranking functions are encoded. The preprocessing component 104 extracts the ranking function and encodes it in the knowledge representation layer 112 to be used later by the query processing component 110. The ranking functions are encoded via intuitive, easy-to-understand "atomic" numerical quantities that describe (a) the global importance of a data value in the ranking process, and (b) the conditional importance of associations between pairs of values (e.g. "if a user requests tuples containing value y of attribute Y, how likely is she to be also interested in value x of attribute X?"). While the pre-processing component 104 derives these quantities automatically, the architecture allows users and/or domain experts to tune these quantities further, thereby customizing the ranking functions for different applications. The other components of computer 100 and database 102 shown in FIGS. 1 and 2 (i.e., atomic probabilities module 114, index module 116, scan algorithm 118, list merge algorithm 120, and global and conditional lists tables 122) are discussed in more detail below in further respect to FIGS. 3 and 4.

The ranking system in general, and the query processing component 110 more specifically, is very efficient because of adaptations made to some known algorithms for Top-K query processing. The adaptations lead to a query processing algorithm that leverages traditional database indexes for computing Top-K matches using the ranking functions. The ranking functions are relatively complex and involve associations/correlations between data values.

Problem Definition and Framework

The problem of ranking database query results will now be formally defined and a general framework/architecture for its solution outlined.

In defining the simplest problem instance, consider a database table D with n tuples {t1, . . . , tn} over a set of m categorical attributes A={A1, . . . , Am}. Consider a "SELECT*FROM D" query Q with a conjunctive selection condition of the form "WHERE X1=x1 AND . . . AND Xp=xp", where each Xk is an attribute and xk is a value in its domain. The set of attributes X={X1, . . . , Xs}⊆ A is known as the set of attributes specified by the query, while the set Y=A−X is known as the set of unspecified attributes. Let S ⊆ {t1, . . . , tn} be the answer set of Q. As discussed above, there are two kinds of ranking problems: (a) Empty-Answer Problem: when the query is too selective, S may be empty, and (b) Many-Answers Problem: when the query is not too selective, S may be too large. Here, the focus is directed to the Many-Answers Problem.

The above scenarios only represent the simplest problem instances, and numerous generalizations are possible. For example, there could be databases with a mix of numeric and categorical attributes. Also, the types of queries described above are fairly restrictive. They are generally referred to as point queries because they specify single-valued equality conditions on each of the specified attributes. In a more general setting, queries may contain IN conditions for categorical attributes (such as "Xk IN Qk", where Qk is a set of values), or range conditions for numeric attributes (such as "Xk BETWEEN [lb, ub]"), or even Boolean operators other than conjunctions. Finally, databases typically contain several tables, and queries may involve the joins of multiple tables.

However, the current focus is on the simple problem instances. While the described techniques extend to all the generalizations mentioned above, in the interest of clarity and brevity, a detailed discussion of these generalizations is omitted.

Figure 3:
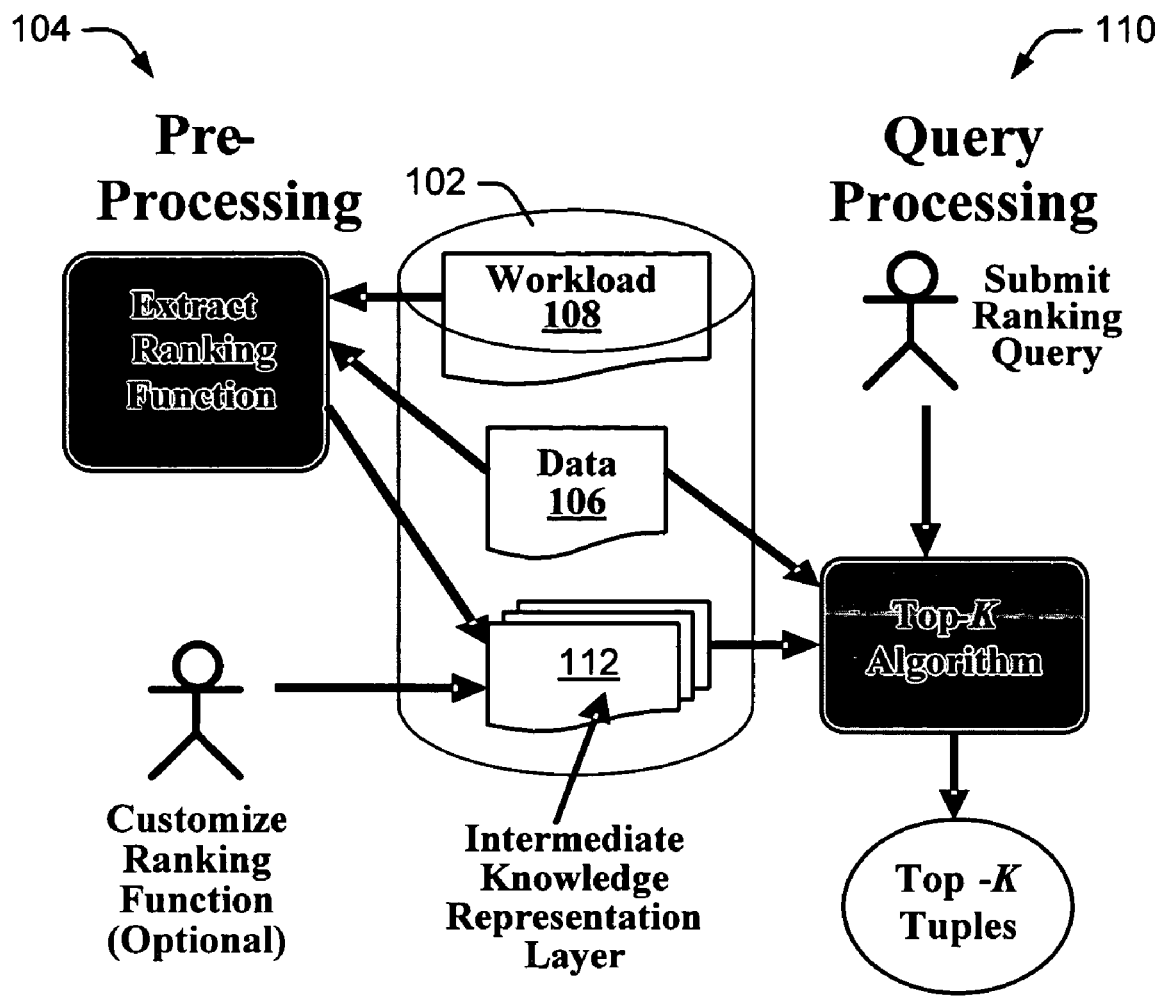
FIG. 3 illustrates a functional representation of some of the architecture of a ranking system for ranking results of database queries.

FIG. 3 provides a functional representation of some of the architecture of a ranking system for enabling ranking of database query results. The system is modular and generic, and it allows for easy customization of the ranking functions for different applications. The pre-processing component 104 leverages data 106 and workload 108 characteristics to automatically extract ranking functions based on probabilistic information retrieval models. The extracted ranking functions are encoded and materialized in the intermediate knowledge representation layer 112.

The intermediate knowledge representation layer 112 contains "atomic" building blocks of the ranking functions that are materialized as auxiliary database tables (FIGS. 1 and 2). The atomic building blocks are intuitive, easy-to-understand numerical quantities that describe (a) the global importance of a data value in the ranking process, and (b) the conditional importance of associations between pairs of values (e.g. "if a user requests tuples containing value x, how likely would she also be interested in value y?"). While the pre-processing component 104 derives these quantities automatically, the architecture allows users and/or domain experts to tune these quantities further as discussed below, thereby customizing the ranking functions for different applications. The query processing component 110 is a top-K algorithm that leverages the extracted ranking functions and efficiently returns the best matches.

Review of Probabilistic Information Retrieval

Much of the material of this subsection is known to those skilled in the art and can be found in any standard textbook on Information Retrieval. The following basic formulas are needed from probability theory:

$$\text{Bayes Rule: } p(a \mid b) = \frac{p(b \mid a) p(a)}{p(b)}$$

$$\text{Product Rule: } p(a, b \mid c) = p(a \mid c) p(b \mid a, c)$$

Consider a documents collection D. For a (fixed) query Q, let R represent the set of relevant documents, and $\overline{R}=D-R$ be the set of irrelevant documents. In order to rank any document t in D, the probability of the relevance of t for the query is needed, i.e. p(R|t). More formally, in probabilistic information retrieval, documents are ranked by decreasing order of their score of relevance, defined as:

$$\text{Score }(t) = \frac{p(R \mid t)}{p(\overline{R} \mid t)} = \frac{\frac{p(t \mid R) p(R)}{p(t)}}{\frac{p(t \mid \overline{R}) p(\overline{R})}{p(t)}} \propto \frac{p(t \mid R)}{p(t \mid \overline{R})}$$

A significant issue is how to compute these probabilities given that R and $\overline{R}$ are unknown at query time. The usual techniques are to make some simplifying assumptions, such as estimating R through user feedback, approximating $\overline{R}$ as D (since R is usually small compared to D), and assuming some form of independence between query terms (e.g. the Binary Independence Model).

Adaptation of PIR Models for Structured Data

In this subsection PIR models are adapted for structured databases, and in particular, for conjunctive queries over a single relational table D. The adaptation is more powerful than the Binary Independence Model as it also leverages limited forms of dependencies between data values, i.e., pair-wise associations.

For any query, recall that X is the set of attributes specified in the query, and Y is the remaining unspecified set of attributes. For convenience, any tuple t is denoted as a vector partitioned into two parts, [X, Y], where X is the part corresponding to the specified attributes, and Y is the remainder. Thus, the score of a tuple can be expressed as follows:

$$\text{Score }(t) \propto \frac{p(t \mid R)}{p(t \mid \overline{R})} = \frac{p(X, Y \mid R)}{p(X, Y \mid \overline{R})} \propto \frac{p(X \mid R)p(Y \mid X, R)}{p(X \mid \overline{R})p(Y \mid X, \overline{R})}$$

Since any quantity not involving Y can be treated as a constant, the score of a tuple can be further expressed as follows:

$$\text{Score }(t) \propto \frac{p(Y \mid X, R)}{p(Y \mid X, \overline{R})}$$

The Binary Independence Model makes the very strong assumption of conditional independence between all attributes. By contrast, the present model allows dependencies between the X and Y attributes. For example, consider a query for homes where "city=Redmond and price=high". For this query the specified attributes are {city, price}. Suppose there was an unspecified attribute such as {View}. The dependencies are leveraged between the specified and unspecified attribute values (e.g., users seeking high-priced homes would be interested in waterfront views).

However, a simplifying assumption is made. Conditional independence within the X (and Y) attributes, respectively, is assumed. In the above example, this assumes that there is no dependency between homes in Redmond and high-priced homes. This is obviously false in many cases. However, this assumption enables the design of very efficient query processing algorithms, something which a more comprehensive dependency model of the data does not seem to allow.

The derivation of the score of a tuple under the above assumptions continues as follows:

$$\text{Score}(t) \propto \prod_{y \in Y} \frac{p(y \mid X, R)}{p(y \mid X, \overline{R})}$$

$$= \prod_{y \in Y} \frac{\frac{p(X, R \mid y)p(y)}{p(X, R)}}{\frac{p(X, \overline{R} \mid y)p(y)}{p(X, \overline{R})}}$$

$$\propto \prod_{y \in Y} \frac{p(X, R \mid y)}{p(X, \overline{R} \mid y)}$$

$$= \prod_{y \in Y} \frac{p(X \mid y)p(R \mid X, y)}{p(X \mid y)p(\overline{R} \mid X, y)}$$

$$= \prod_{y \in Y} \frac{p(R \mid X, y)}{p(\overline{R} \mid X, y)}$$

$$= \prod_{y \in Y} \frac{\frac{p(X, y \mid R)p(R)}{p(X, y)}}{\frac{p(X, y \mid \overline{R})p(\overline{R})}{p(X, y)}}$$

$$\propto \prod_{y \in Y} \frac{p(X, y \mid R)}{p(X, y \mid \overline{R})}$$

$$= \prod_{y \in Y} \frac{p(y \mid R)p(X \mid y, R)}{p(y \mid \overline{R})p(X \mid y, \overline{R})}$$

$$= \prod_{y \in Y} \frac{p(y \mid R)}{p(y \mid \overline{R})} \prod_{y \in Y} \prod_{x \in X} \frac{p(x \mid y, R)}{p(x \mid y, \overline{R})}$$

For the Many-Answers Problem, the assumption is made that p(x|y,R)=1 because all relevant tuples will have the same x-values that are specified in the query. Thus, the score of a tuple is as follows:

$$\text{Score}(t) \propto \prod_{y \in Y} \frac{p(y \mid R)}{p(y \mid \overline{R})} \prod_{y \in Y} \prod_{x \in X} \frac{1}{p(x \mid y, \overline{R})} \quad (1)$$

Workload-Based Estimation

In order to compute the score of a tuple according to Equation 1, the following quantities must be estimated: p(y|R), p(y|$\overline{R}$) and p(x|y,$\overline{R}$).

However, this requires knowledge of R and $\overline{R}$, which are unknown at query time. The usual techniques in Information Retrieval are to estimate R through user feedback (relevance feedback) at query time, and approximate $\overline{R}$ as D (since R is usually small compared to D). In the present case, however, a fully automated baseline approach is provided that avoids tedious relevance feedback computations at query time. Available workload information is leveraged during the pre-processing phase, such that user interaction can be avoided during the query processing phase.

It is assumed that a workload W 108 (i.e., a collection of ranking queries that have been executed on our system in the past) is available. The workload W 108 is represented as a set of "tuples", where each tuple represents a query and contains the corresponding values of the specified attributes. The techniques do not require as inputs, both workload queries and their correctly ranked results. Gathering the correctly ranked results is tedious and involves user feedback, whereas gathering only the queries is relatively easy since profiling tools exist on most commercial DBMS that can log each query string that executes on the system.

The following example shows how the workload ranking will be used. Consider that a user has requested homes where "city=Redmond and price=high". Although the user has not specified such information in the query, there should be an inference made for the user that it is desirable to rank homes with waterfront views over homes without such views. This information can also be provided by a domain expert (i.e., the architecture is generic enough to allow further customization of the ranking functions by human experts, as discussed below). However, the present system focuses on a low-cost automated approach that avoids tedious human interactions and instead discovers such information by analyzing the workload 108. For example, an analysis of the workload 108 may reveal that many users in the past have made requests for high-priced homes and waterfront views.

More specifically, consider a new query Q which specifies a set X of attributes. The workload 108 can be used in determining its relevant set, R. Two critical assumptions are made:

1) $\overline{R}$ is approximated as D 106;

2) R is approximated as all queries in W 108 that also request for X.

The first assumption is standard in Information Retrieval (i.e., that the set of irrelevant tuples may be approximated as the entire database data 106). The second assumption is novel (i.e., that all properties of the set of relevant tuples R can be obtained by only examining the subset of the workload 108 that contains queries that also request for X). Thus, for a query such as "city=Redmond and price=high", the workload 108 can be used to determine what such users have also requested in the past.

One difficulty is that the workload 108 may be rather sparse, i.e., there may not be enough queries which completely contain all the specified attribute values X of the current query to allow us to derive a robust-sized R for analysis. However, as can be seen in the following derivations, this difficulty is circumvented by resorting to the conditional independence assumption between attributes of X.

Under the above assumptions, the following can be written:

$$p(y|R) = p(y|X, W)$$

$$p(y|\overline{R}) = p(y|D)$$

$$p(x|y,\overline{R}) = p(x|y,D)$$

Making these substitutions in Equation 1 results in:

$$\text{Score}(t) \propto \prod_{y \in Y} \frac{p(y|X, W)}{p(y|D)} \prod_{y \in Y} \prod_{x \in X} \frac{1}{p(x|y, D)}$$

$$= \prod_{y \in Y} \frac{\frac{p(X, W|y)p(y)}{p(X, W)}}{p(y|D)} \prod_{y \in Y} \prod_{x \in X} \frac{1}{p(x|y, D)}$$

$$\propto \prod_{y \in Y} \frac{p(X, W|y)p(y)}{p(y|D)} \prod_{y \in Y} \prod_{x \in X} \frac{1}{p(x|y, D)}$$

$$= \prod_{y \in Y} \frac{p(W|y)p(X|W, y)p(y)}{p(y|D)} \prod_{y \in Y} \prod_{x \in X} \frac{1}{p(x|y, D)}$$

$$\propto \prod_{y \in Y} \frac{p(y|W) \prod_{x \in X} p(x|y, W)}{p(y|D)} \prod_{y \in Y} \prod_{x \in X} \frac{1}{p(x|y, D)}$$

Therefore, the score of a tuple can be finally written as:

$$\text{Score}(t) \propto \prod_{y \in Y} \frac{p(y|W)}{p(y|D)} \prod_{y \in Y} \prod_{x \in X} \frac{p(x|y, W)}{p(x|y, D)} \quad (2)$$

Equation 2 is the final ranking formula used throughout the remainder of this discussion. The first factor may be considered as the global part of the score, while the second factor may be considered as the conditional part of the score.

Note that unlike Equation 1, R and $\overline{R}$ have effectively been eliminated from the formula, and only the quantities such as the following need to be computed: p(y|W), p(x|y, W), p(y|D) and p(x|y,D). Each of these quantities will be pre-computed for all distinct values in the database data 106 and stored as auxiliary tables (atomic probabilities tables) in the intermediate knowledge representation layer 112. The quantities p(y|W) and p(y|D) are the relative frequencies of each distinct value y in the workload 108/database data 106, respectively (the latter is similar to IDF, or the inverse document frequency concept in Information Retrieval), while the quantities p(x|y, W), and p(x|y,D) may be estimated by computing pair-wise association rules in the workload 108/database data 106, respectively. Once this pre-computation has been completed and the intermediate layer 112 constructed, at query time the necessary quantities may be retrieved and appropriately composed for performing the rankings. Further details of the implementation of these steps are discussed below in the exemplary implementation sections.

Customizing the Ranking Function

While the above approach is a completely automated approach based on workload 108 analysis, it is possible that sometimes the workload 108 may be insufficient and/or unreliable. In such instances, it may be necessary for domain experts to be able to tune the ranking function to make it more suitable for the application at hand. This is easily achievable in the described architecture, because the atomic quantities have intuitive and easy to understand semantics. In particular, p(y|W) represents the "unconditional" importance of the value y for ranking purposes. Thus a domain expert may give p(Redmond|W) a higher value than p(Carnation|W) if the expert believes that Redmond is generally a more desirable location than Carnation for buying a home (both are suburbs of Seattle). Likewise, p(x|y, W) represents the "conditional" importance of associations between pairs of values. Thus a domain expert may set p(waterfront|high-price, W) at a higher value than p(corner-lot|high-price, W) if the expert believes that people requesting high-priced homes would prefer waterfront properties rather than corner-lot locations.

Ranking Without Dependency Assumptions

If the conditional dependency assumption is dropped, then the score of a tuple t may be derived as:

$$\prod_{y \in Y} \frac{p(y|W)}{p(y|D)} \prod_{y \in Y} \prod_{x \in X} \frac{p(x|y, W)}{p(x|y, D)} = \prod_{y \in Y} \frac{p(y|W)}{p(y|D)} \prod_{y \in Y} \prod_{x \in X} \frac{p(x|W)}{p(x|D)} \propto$$

$$\prod_{y \in Y} \frac{p(y|W)}{p(y|D)}$$

Exemplary Implementation of Pre-Processing Component

Figure 4:
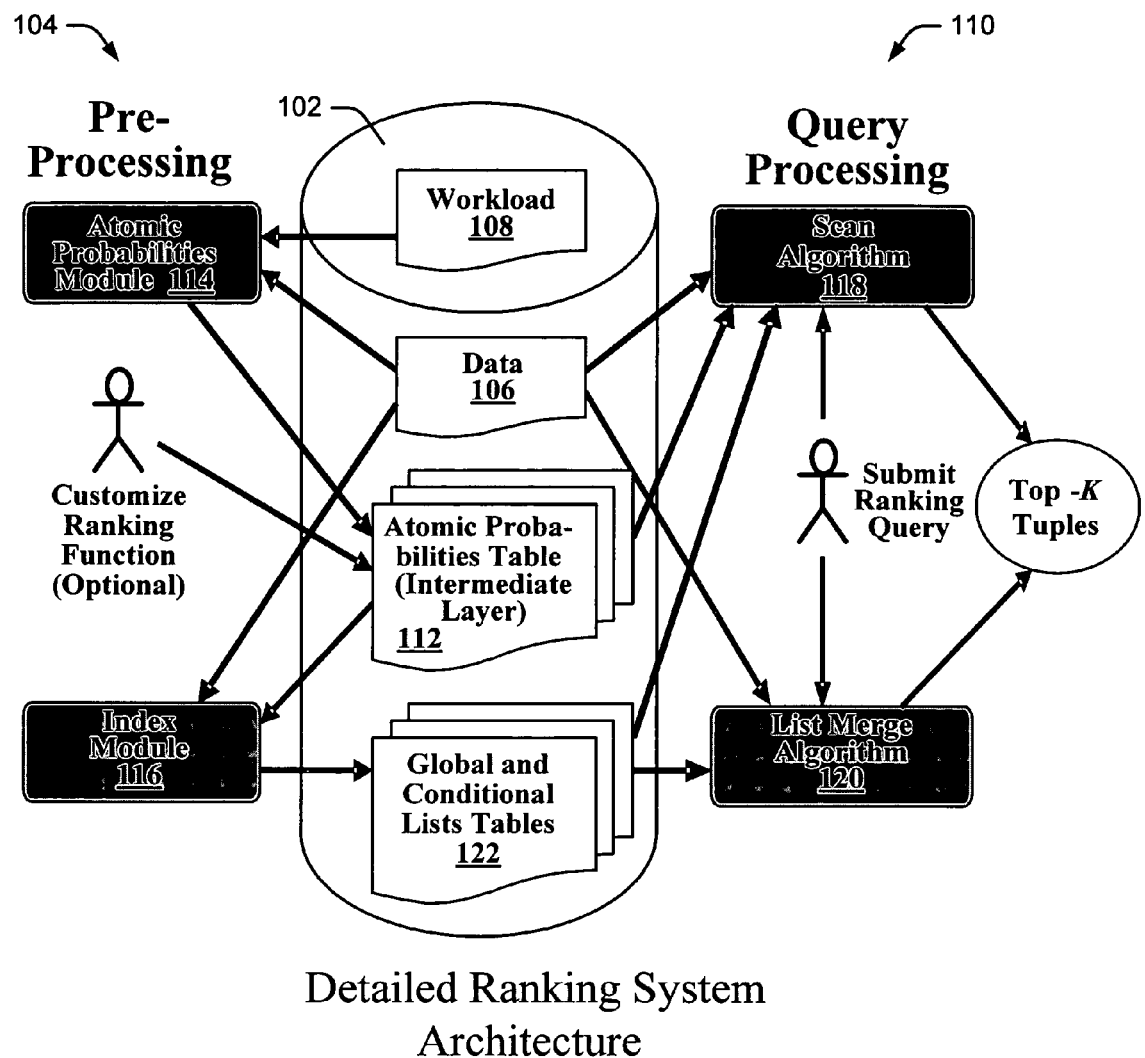
FIG. 4 illustrates a detailed architecture of a database ranking system including pre-processing and query processing components and their sub-modules.

FIG. 4 shows the detailed architecture of the database ranking system including the pre-processing 104 and query processing 110 components as well as their sub-modules (i.e., atomic probabilities module 114, index module 116, scan algorithm 118, list merge algorithm 120).

The pre-processing component 104 is divided into several modules. First, the Atomic Probabilities Module 114 computes the quantities p(y|W), p(y|D), p(x|y, W), and p(x|y,D) for each distinct value of x and y. The former two quantities can be computed by scanning the workload 108 and data 106 respectively, while the latter two quantities can be computed by running a pair-wise association rule mining algorithm on the workload 108 and data 106 respectively, as discussed above. These atomic quantities are stored as database tables in the intermediate knowledge representation layer 112, with appropriate indexes to enable easy retrieval. As mentioned above, they can be further customized by human experts if necessary.

The intermediate layer 112 now contains enough information for computing the ranking function, and a naïve query processing algorithm can be designed which for any query, scans the result tuples, computes the score for each tuple using the information in this intermediate layer 112, and returns the Top-K tuples. However, specialized data structures are also built which enable a much more efficient query processing than linear scans.

These data structures are built in the Index Module 116 of the pre-processing component 104. The algorithm for the Index Module 116 index is as follows:

```
FOR EACH distinct value x of database DO
    FOR EACH tuple t containing x with tuple-id = TID DO
```

$$CondScore = \frac{\prod_{z \in t} p(x | z, W)}{\prod_{z \in t} p(x | z, D)}$$

```
        Add <TID, CondScore> to Cx;
```

$$GlobScore = \frac{\prod_{z \in t} p(z | W)}{\prod_{z \in t} p(z | D)};$$

```
        Add <TID, GlobScore> to Gx;
    END FOR
END FOR
```

The Index Module 116 inputs the association rules and the database data 106, and for every distinct value x, creates two lists Cx and Gx 122, each containing the tuple-ids of all data tuples that contain x, ordered in specific ways. These two lists are defined as follows:

1. Conditional List $C_x$: This list consists of pairs of the form <TID, CondScore>, ordered by descending CondScore, where TID is the tuple-id of a tuple t that contains x and where $$CondScore = \frac{\prod_{z \in t} p(x | z, W)}{\prod_{z \in t} p(x | z, D)}$$

2. Global List $G_x$: This list consists of pairs of the form <TID, GlobScore>, ordered by descending GlobScore, where TID is the tuple-id of a tuple t that contains x and where $$GlobScore = \frac{\prod_{z \in t} p(z | W)}{\prod_{z \in t} p(z | D)}$$

Consider a tuple t that satisfies a query Q specifying conditions for a set X={x1, . . . ,xs} of attribute values. While its score (as defined in Equation 2) can of course be "calculated from scratch" by retrieving the relevant atomic probabilities from the intermediate layer 112 and composing them appropriately, a more efficient way is to retrieve and multiply the scores of t in the lists C1, . . . ,Cxs and in one of Gx1, . . . ,Gxs. The latter requires only s+1 multiplications and results in a score that is proportional to the actual score. The other reason for calculating the score this way is that, since these lists are kept in sorted order of their scores, it enables the employment of a known top-K algorithm (called TA, Threshold Algorithm) that is more efficient than a linear scan to retrieve the best matches. Further details are discussed below in the exemplary implementation of query processing component section.

The index module 116 computes the global and conditional lists 122 and materializes them as database tables, with appropriate indexes to enable two kinds of access operations efficiently. Given a value x, it should be possible to perform a GetNextTID operation on lists Cx and Gx in constant time, i.e., the tuple-ids in the lists should be efficiently retrievable one-by-one in order of decreasing score. It should also be possible to perform random access on the lists, i.e., given a TID, the corresponding score (CondScore or GlobScore) should be retrievable in constant time.

All the conditional lists are maintained in one table called CondList (with columns AttName, AttVal, TID, and CondScore), while all the global lists are maintained in another table called GlobList (with columns AttName, AttVal, TID, and GlobScore). If there are clustered B+ tree indexes on the columns, it is easy to see that both access operations can be performed efficiently.

Exemplary Implementation of Query Processing Component

With respect to the query processing component 110, two different algorithms are developed to efficiently calculate the Top-K results of a query Q specifying conditions for a set X of attributes, given the data structures (i.e., lists Cx and Gx 122) created during the pre-processing stage. First, the List Merge algorithm 120 is based on the Threshold Algorithm. The List Merge algorithm 120 is superior when Q returns many results. Second, the Scan algorithm 118 uses a more naïve approach which leverages the querying capabilities of the DBMS. The Scan algorithm 118 is the best choice when Q returns relatively fewer results.

The List Merge algorithm 120 is an adaptation of the Threshold Algorithm (TA) and its derivatives to retrieve the Top-K tuples without having to process all tuples of the database data 106. The List Merge algorithm 120 is as follows:

| List Merge Algorithm |
| --- |
| Input: Query, data table, global and conditional lists |
| Output: Top-K tuples |
| Let $G_{xb}$ be the shortest list among $G_{x1}, \ldots, G_{xs}$ |
| Let B = {} be a buffer that can hold K tuples ordered by score |
| Let T be an array of size s + 1 storing the last score from each list |
| Initialize B to empty |
| REPEAT |
|     FOR EACH list L in $C_{x1}, \ldots, C_{xs}$, and $G_{xb}$ DO |
|         TID = GetNextTID(L) |
|         Update T with score of TID in L |
|         Get score of TID from other lists via random access |
|         IF all lists contain TID THEN |
|             Compute Score(TID) by multiplying retrieved scores |
|             Insert <TID, Score(TID) > in the correct position in B |
|         END IF |
|     END FOR |
| UNTIL B[K].Score $\geq \prod_{i=1}^{s+1} T[i]$ |
| RETURN B |

Given a query Q specifying conditions for a set X= {x1, . . . ,xs} of attributes, the TA algorithm is executed on the following s+1 lists: Cx1, . . . ,Cxs, and Gxb, where Gxb is the shortest list among Gx1, . . . ,Gxs (in principle, any list from $G_{x1}, \ldots, G_{xs}$ would do, but the shortest list is likely to be more efficient). During each iteration, the TID with the next largest score is retrieved from each list using sorted access. Its score in every other list is retrieved via random access, and all these retrieved scores are multiplied together, resulting in the final score of the tuple (which is proportional to the actual score derived in Equation 2). The termination criterion guarantees that no more GetNextTID operations will be needed on any of the lists. This is accomplished by maintaining an array T which contains the last scores read from all the lists at any point in time by GetNextTID operations. The product of the scores in T represents the score of the very best tuple we can hope to find in the data that is yet to be seen. If this value is no more than the tuple in the Top-K buffer with the smallest score, the algorithm successfully terminates. Note that the GetNextTID operations correspond to sorted access operations in TA.

So far an assumption has been made that there is enough space available to build the conditional and global lists 122. However, there may be applications where space is an expensive resource. In such cases, subsets of the lists 122 can be stored at pre-processing time, at the expense of an increase in the query processing time.

Determining which lists 122 to retain/omit at pre-processing time may be accomplished by analyzing the workload 108. A simple solution is to store the conditional lists Cx and the corresponding global lists Gx only for those attributes whose values x occur most frequently in the workload 108. For the values of the remaining attributes, only their maximum GlobScore and CondScore are stored.

At query time, since the lists of some of the specified attributes may be missing, the intuitive idea is to probe the intermediate knowledge representation layer 112 (where the "relatively raw" data is maintained, i.e., the atomic probabilities) and directly compute the missing information. Effectively this shifts the task from pre-processing time to query processing time.

More specifically, a modification of the Threshold Algorithm is used, where not all sources have sorted access. This requires that at least for one of the query-specified values x, the corresponding lists Cx and Gx are available—if none are available, then an alternative query processing algorithm must be used such as a linear scan. To calculate the score for a tuple t in a missing list Cx (similarly Gx), t is retrieved from the database data 106. If t satisfies Q, random accesses are made to the intermediate layer 112 to retrieve the appropriate atomic probabilities necessary to compute these missing scores.

An alternative to the threshold algorithm is a naive query processing algorithm, which for any query, scans the result tuples, computes the score for each tuple that satisfies the selection condition using the information in the intermediate layer 112, and returns the Top-K tuples.

Another alternative scan approach (Scan algorithm 118) is to leverage the information available in the conditional and global lists 122. This version of the scan algorithm 118 consists of three steps as follows:

---

Let S be the table returned by the DBMS for query Q={$x_1...x_s$}
FOR EACH tuple t with tuple-id tid in S DO
  FOR EACH x in ={$x_1...x_s$} DO
    t.Score = t.Score * ScoreLookup (tid, $C_x$);
  END FOR
  t.Score = t.Score * *ScoreLookup (tid, $G_{xt}$);
END FOR
Return Top-K tuples in S with highest score;

---

First, Q is submitted to the DBMS, and the selected tuples are stored in a temporary table S. Second, the score of each tuple t of S is calculated using s+1 random access to the conditional and the global lists 122. Finally, the Top-K tuples in S according to their score are calculated using a "Top-K" SQL statement by the DBMS.

As with the List Merge algorithm 120, when not all lists are pre-calculated, random accesses are made to the intermediate layer 112 to retrieve atomic probabilities necessary for computing the missing scores for every missing list for a specific tuple t.

Exemplary Methods

Figure 5:
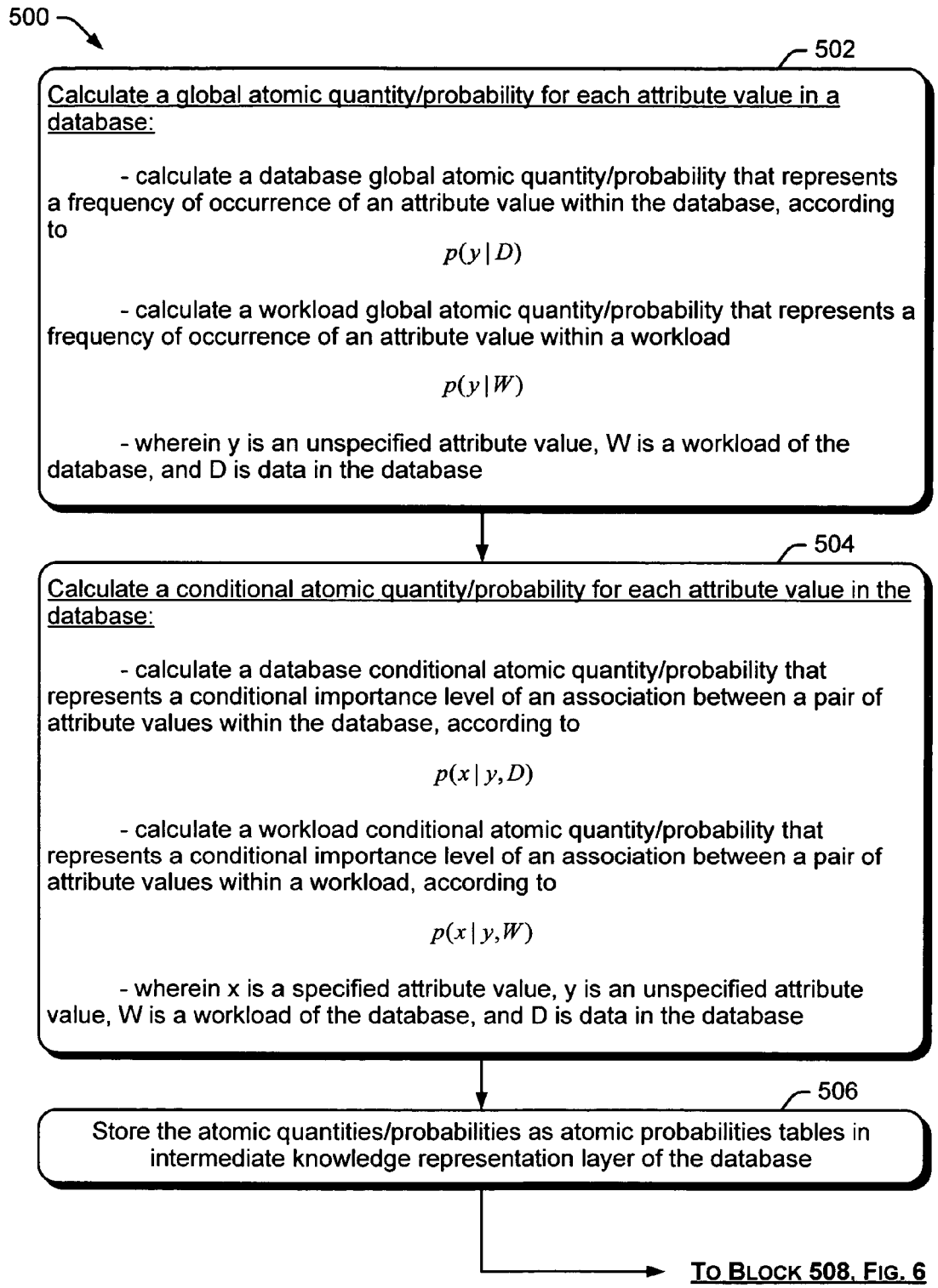
FIG. 5 is a flow diagram illustrating exemplary methods for ranking database query results.

Example methods for ranking database query results will now be described with primary reference to the flow diagrams of FIGS. 5-7. The methods apply to the exemplary embodiments discussed above with respect to FIGS. 1-4. While one or more methods are disclosed by means of flow diagrams and text associated with the blocks of the flow diagrams, it is to be understood that the elements of the described methods do not necessarily have to be performed in the order in which they are presented, and that alternative orders may result in similar advantages. Furthermore, the methods are not exclusive and can be performed alone or in combination with one another. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use or execution by a processor. A processor-readable medium can be, without limitation, an electronic, magnetic, optical, electromagnetic, infrared, or semiconductor system, apparatus, or device. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

At block 502 of method 500, a global quantity (i.e., a probability) for each attribute value in a database is calculated. An atomic probabilities module 114 of a pre-processing component 104 calculates the global quantity/probability as a frequency of occurrence of an attribute value within the database, according to:

$p(y|D)$

The atomic probabilities module 114 also calculates the global quantity/probability as a frequency of occurrence of an attribute value within a workload, according to:

$p(y|w)$

In these global quantities/probabilities, y is an unspecified attribute value, W is a workload of the database, and D is data in the database.

At block 504, the atomic probabilities module 114 calculates a conditional quantity (i.e., a probability) for each attribute value in a database and workload. The conditional quantity/probability represents a conditional importance level of an association between a pair of attribute values within the database and within the workload, respectively according to:

$p(x|y,D)$ and $p(x|y,W)$

In these conditional quantities/probabilities, x is a specified attribute value in a database query, y is an unspecified attribute value, W is a workload of the database, and D is data in the database.

At block 506, the atomic quantities/probabilities calculated in blocks 502 and 504 are stored in an intermediate knowledge representation layer 112 of the database as atomic probabilities tables.

Figure 6:
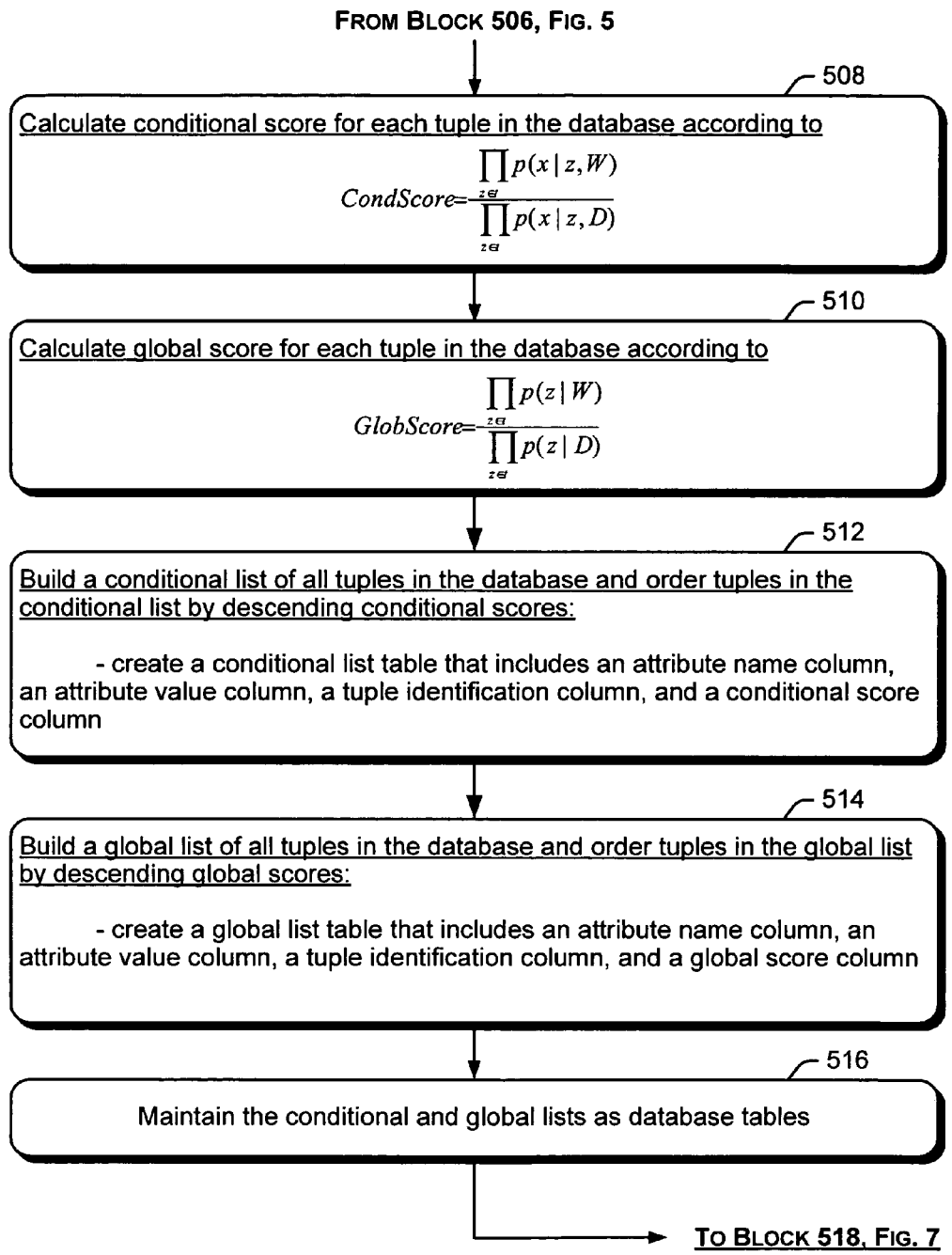
FIG. 6 is a continuation of the flow diagram of FIG. 5 illustrating exemplary methods for ranking database query results.

At block 508 of method 500, which is continued at FIG. 6, a conditional score for each tuple (i.e., each row in database table) of a database is calculated based on the conditional atomic quantities/probabilities stored in the intermediate knowledge representation layer 112. An index module 116 in a pre-processing component 104 calculates a conditional score for each tuple in the database from atomic quantities/probabilities according to:

$$CondScore = \frac{\prod_{z \in t} p(x | z, W)}{\prod_{z \in t} p(x | z, D)}$$

At block 510 of method 500, a global score for each tuple (i.e., each row in database table) of a database is calculated based on the global atomic quantities/probabilities stored in the intermediate knowledge representation layer 112. The index module 116 calculates a global score for each tuple in the database from atomic quantities/probabilities according to:

$$GlobScore = \frac{\prod_{z \in t} p(z | W)}{\prod_{z \in t} p(z | D)}$$

At block 512, the index module 116 builds a conditional list of tuples in the database and orders the tuples in the conditional list by descending conditional scores. The conditional list consists of pairs of the form <TID, CondScore>, ordered by a descending conditional score, where TID is the tuple-id of a tuple t that contains an attribute value x. At block 514, the index module 116 builds a global list of tuples in the database and orders the tuples in the global list by descending global scores. The global list consists of pairs of the form <TID, GlobScore>, ordered by a descending global scores, where TID is the tuple-id of a tuple t that contains an attribute value x. The conditional and global lists are maintained in database list tables 122, as shown at block 516.

At block 518 of method 500, which is continued at FIG. 7, the conditional and global lists in the database list tables 122 are configured with indexes which enable the retrieval of tuples from the lists. Examples of retrieving tuples from database list tables 122 include retrieval of tuples one-by-one in order of decreasing score and retrieval of tuples by random access.

At block 520, a ranking score is calculated for each result tuple of a database query result, and the result tuples are ranked. In general, conditional and global scores for each result tuple that contains a query-specified attribute value are retrieved from the conditional and global lists. The retrieved scores are then multiplied to compute a final ranking score according to:

$$Score(t) \propto \prod_{y \in Y} \frac{p(y | W)}{p(y | D)} \prod_{y \in Y} \prod_{x \in X} \frac{p(x | y, W)}{p(x | y, D)} \quad (2)$$

The retrieval and ranking process can be performed by use of a linear scan algorithm 118 of a query processing component 110. The scan algorithm 118 scans the query result tuples, randomly accesses tuples from the conditional and global lists, computes a final score for each result tuple, and returns Top-k tuples having the top final scores. The retrieval and ranking process can also be performed by a list merge algorithm 120 of a query processing component 110. The list merge algorithm 120 performs a 'get next tuple' operation on the conditional and global lists, retrieves tuples one-by-one in order of decreasing conditional and global scores, and executes a threshold algorithm to return Top-k tuples having the top final scores. More specifically, given a query Q specifying conditions for a set X={x1, . . . ,xs} of attributes, the list merge algorithm 120 is executed on the following s+1 conditional and global lists: Cx1, . . . ,Cxs, and Gxb, where Gxb is the shortest list among Gx1, . . . ,Gxs. During each iteration, the TID with the next largest score is retrieved from each list using sorted access. Its score in every other list is retrieved via random access, and all these retrieved scores are multiplied together, resulting in the final score of the tuple (which is proportional to the actual score derived in Equation 2). The termination criterion guarantees that no more GetNextTID operations will be needed on any of the lists. This is accomplished by maintaining an array T which contains the last scores read from all the lists at any point in time by GetNextTID operations. The product of the scores in T represents the score of the best tuple in the data that is yet to be seen. If this value is no more than the tuple in the Top-K buffer with the smallest score, the algorithm successfully terminates.

Exemplary Computing Environment

Figure 8:
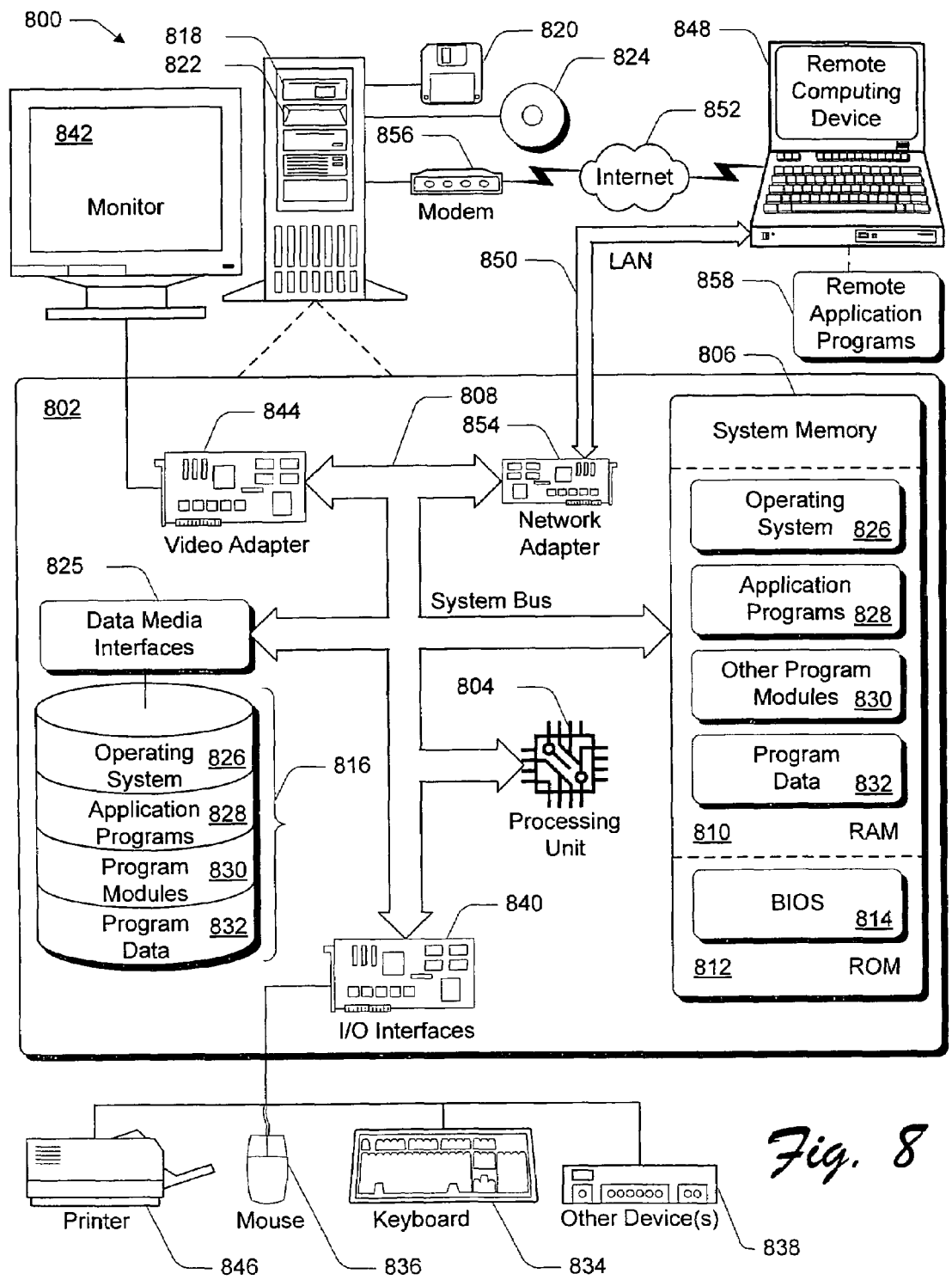
FIG. 8 illustrates an exemplary computing environment suitable for implementing computers such as those discussed with reference to FIGS. 1 and 2.

FIG. 8 illustrates an exemplary computing environment suitable for implementing computers 100 and 200 as that discussed above with reference to FIGS. 1-4. Although one specific configuration is shown in FIG. 8, computers 100 and 200 may be implemented in other computing configurations.

The computing environment 800 includes a general-purpose computing system in the form of a computer 802. The components of computer 802 may include, but are not limited to, one or more processors or processing units 804, a system memory 806, and a system bus 808 that couples various system components including the processor 804 to the system memory 806.

The system bus 808 represents one or more of any of several types of bus structures, including a memory bus or memory controller, a peripheral bus, an accelerated graphics port, and a processor or local bus using any of a variety of bus architectures. An example of a system bus 808 would be a Peripheral Component Interconnects (PCI) bus, also known as a Mezzanine bus.

Computer 802 includes a variety of computer-readable media. Such media can be any available media that is accessible by computer 802 and includes both volatile and non-volatile media, removable and non-removable media. The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 contains data and/or program modules that are immediately accessible to and/or presently operated on by the processing unit 804.

Computer 802 may also include other removable/non-removable, volatile/non-volatile computer storage media. By way of example, FIG. 8 illustrates a hard disk drive 816 for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces 825. Alternatively, the hard disk drive 816, magnetic disk drive 818, and optical disk drive 822 may be connected to the system bus 808 by a SCSI interface (not shown).

The disk drives and their associated computer-readable media provide non-volatile storage of computer readable instructions, data structures, program modules, and other data for computer 802. Although the example illustrates a hard disk 816, a removable magnetic disk 820, and a removable optical disk 824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk &16, magnetic disk 820, optical disk 824, ROM 812, and/or RAM 810, including by way of example, an operating system 826, one or more application programs 828, other program modules 830, and program data 832. Each of such operating system 826, one or more application programs 828, other program modules 830, and program data 832 (or some combination thereof) may include an embodiment of a caching scheme for user network access information.

Computer 802 can include a variety of computer/processor readable media identified as communication media. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 804 via input/output interfaces 840 that are coupled to the system bus 808, but may be connected by other interface and bus structures, such as a parallel port, game port, or a universal serial bus (USB).

A monitor 842 or other type of display device may also be connected to the system bus 808 via an interface, such as a video adapter 844. In addition to the monitor 842, other output peripheral devices may include components such as speakers (not shown) and a printer 846 which can be connected to computer 802 via the input/output interfaces 840.

Computer 802 may operate in a networked environment using logical connections to one or more remote computers, such as a remote computing device 848. By way of example, the remote computing device 848 can be a personal computer, portable computer, a server, a router, a network computer, a peer device or other common network node, and the like. The remote computing device 848 is illustrated as a portable computer that may include many or all of the elements and features described herein relative to computer system 802.

Logical connections between computer 802 and the remote computer 848 are depicted as a local area network (LAN) 850 and a general wide area network (WAN) 852. Such networking environments are commonplace in offices, enterprise-wide computer networks, intranets, and the Internet. When implemented in a LAN networking environment, the computer 802 is connected to a local network 850 via a network interface or adapter 854. When implemented in a WAN networking environment, the computer 802 includes a modem 856 or other means for establishing communications over the wide network 852. The modem 856, which can be internal or external to computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with computing environment 800, program modules depicted relative to the computer 802, or portions thereof, may be stored in a remote memory storage device. By way of example, remote application programs 858 reside on a memory device of remote computer 848. For purposes of illustration, application programs and other executable program components, such as the operating system, are illustrated herein as discrete blocks, although it is recognized that such programs and components reside at various times in different storage components of the computer system 802, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method for ranking results of a present database query comprising:
   accessing a specified attribute value from the present database query;
   accessing one or more unspecified attribute values from a workload, wherein the workload includes attribute values associated with one or more previous database queries including the specified attribute value;
   calculating a global atomic quantity for each of the one or more unspecified attribute values in a database, each global atomic quantity representing an unconditional importance level of its respective unspecified attribute value;

calculating a conditional atomic quantity for each of the one or more unspecified attribute values in the database, each conditional atomic quantity representing a conditional importance level of an association between each of the one or more unspecified attribute values and the specified attribute value; and ranking result tuples of the present database query based on the global atomic quantities and the conditional atomic quantities, wherein the ranking result tuples comprises:

calculating a conditional score for each tuple in the database;

calculating a global score for each tuple in the data base; and using conditional scores and global scores, calculating a ranking score for each result tuple of the present database query that includes the specified attribute value;

wherein the calculating a conditional score comprises calculating a conditional score according to:

$$CondScore = \frac{\prod_{z \in t} p(x|z, W)}{\prod_{z \in t} p(x|z, D)};$$

and wherein the calculating a global score comprises calculating a global score according to:

$$GlobScore = \frac{\prod_{z \in t} p(z|W)}{\prod_{z \in t} p(z|D)}$$

wherein t is a tuple that contains a specified attribute value from the present database query, x is a specified attribute value from the present database query, z is an unspecified attribute value from the present database query, W is a workload of the database, and D is data in the database.

2. The method as recited in claim 1, wherein the calculating a global atomic quantity is selected from the group comprising:

calculating a database global atomic quantity that represents a frequency of occurrence of an unspecified attribute value within the database; and calculating a workload global atomic quantity that represents a frequency of occurrence of an unspecified attribute value within the workload.

3. The method as recited in claim 1, wherein the calculating a conditional atomic quantity is selected from the group comprising:

calculating a database conditional atomic quantity that represents a conditional importance level of an association between each of the one or more unspecified attribute values and the specified attribute value within the database; and calculating a workload conditional atomic quantity that represents a conditional importance level of an association between each of the one or more unspecified attribute values and the specified attribute value within the workload.

4. The method as recited in claim 1, further comprising:

building a conditional list of all tuples in the database and ordering tuples in the conditional list by descending conditional scores; and building a global list of all tuples in the database and ordering tuples in the global list by descending global scores.

5. The method as recited in claim 4, wherein calculating a ranking score for a result tuple comprises:

retrieving a conditional score for the result tuple from the conditional list;

retrieving a global score for the result tuple form the global list; and multiplying the global score and the conditional score.

6. The method as recited in claim 1, wherein the calculating a ranking score comprises calculating a ranking score according to:

$$Score(t) \propto \prod_{y \in Y} \frac{p(y|W)}{p(y|D)} \prod_{y \in Y} \prod_{x \in X} \frac{p(x|y, W)}{p(x|y, D)}.$$

7. The method as recited in claim 4, further comprising:

maintaining the conditional list and the global list in database tables; and enabling retrieval of tuples from the database tables through indexes in the database tables.

8. The method as recited in claim 7, wherein the enabling retrieval includes enabling retrieval of tuples one-by-one in order of decreasing score and enabling retrieval of tuples by random access.

9. The method as recited in claim 4, wherein:

building a conditional list comprises creating a conditional list table that includes an attribute name column, an attribute value column, a tuple identification column, and a conditional score column; and wherein building a global list comprises creating a global list table that includes an attribute name column, an attribute value column, a tuple identification column, and a global score column.

10. One or more computer-readable storage media storing computer-executable instructions that, when executed on one or more processors, perform a method for ranking results of a present database query, the method comprising:

accessing a specified attribute value from the present database query;

accessing one or more unspecified attribute values from a workload, wherein the workload includes attribute values associated with one or more previous database queries including the specified attribute value;

calculating a global atomic quantity for each of the one or more unspecified attribute values in a database, each global atomic quantity representing an unconditional importance level of its respective unspecified attribute value;

calculating a conditional atomic quantity for each of the one or more unspecified attribute values in the database, each conditional atomic quantity representing a conditional importance level of an association between each of the one or more unspecified attribute values and the specified attribute value; and ranking result tuples of the present database query based on the global atomic quantities and the conditional atomic quantities, wherein the ranking result tuples comprises:

calculating a conditional score for each tuple in the database;

calculating a global score for each tuple in the database; and using conditional scores and global scores, calculating a ranking score for each result tuple of the present database query that includes the specified attribute value;

wherein the calculating a conditional score comprises calculating a conditional score according to:

$$CondScore = \frac{\prod_{z \in t} p(x|z, W)}{\prod_{z \in t} p(x|z, D)};$$

and wherein the calculating a global score comprises calculating a global score according to:

$$GlobScore = \frac{\prod_{z \in t} p(z|W)}{\prod_{z \in t} p(z|D)}$$

wherein t is a tuple that contains a specified attribute value from the present database query, x is a specified attribute value from the present database query, z is an unspecified attribute value from the present database query, W is a workload of the database, and D is data in the database.

11. The one or more computer-readable storage media as recited in claim 10, wherein the calculating a global atomic quantity is selected from the group comprising:

calculating a database global atomic quantity that represents a frequency of occurrence of an unspecified attribute value within the database; and calculating a workload global atomic quantity that represents a frequency of occurrence of an unspecified attribute value within the workload.

12. The one or more computer-readable storage media as recited in claim 10, wherein the calculating a conditional atomic quantity is selected from the group comprising:

calculating a database conditional atomic quantity that represents a conditional importance level of an association between each of the one or more unspecified attribute values and the specified attribute value within the database; and calculating a workload conditional atomic quantity tat represents a conditional importance level of an association between each of the one or more unspecified attribute values and the specified attribute value within the workload.

13. The one or more computer-readable storage media as recited in claim 10, wherein the one or more computer-readable storage media further store computer-executable instructions for:

building a conditional list of all tuples in the database and ordering tuples in the conditional list by descending conditional scores; and building a global list of all tuples in the database and ordering tuples in the global list by descending global scores.

14. The one or more computer-readable storage media as recited in claim 13, wherein calculating a ranking score for a result tuple comprises:

retrieving a conditional score for the result tuple from the conditional list;

retrieving a global score for the result tuple form the global list; and multiplying the global score and the conditional score.

15. The one or more computer-readable storage media as recited in claim 10, wherein the calculating a ranking score comprises calculating a ranking score according to:

$$Score(t) \propto \prod_{y \in Y} \frac{p(y|W)}{p(y|D)} \prod_{y \in Y} \prod_{x \in X} \frac{p(x|y, W)}{p(x|y, D)}.$$

16. The one or more computer-readable storage media as recited in claim 13, wherein the one or more computer-readable storage media further store computer-executable instructions for:

maintaining the conditional list and the global list in database tables; and enabling retrieval of tuples from the database tables through indexes in the database tables.

17. The one or more computer-readable storage media as recited in claim 16, wherein the enabling retrieval includes enabling retrieval of tuples one-by-one in order of decreasing score and enabling retrieval of tuples by random access.

18. The one or more computer-readable storage media as recited in claim 13, wherein:

building a conditional list comprises creating a conditional list table that includes an attribute name column, an attribute value column, a tuple identification column, and a conditional score column; and wherein building a global list comprises creating a global list table that includes an attribute name column, an attribute value column, a tuple identification column, and a global score column.

19. A system comprising:

one or more processors; and one or more computer-readable storage media storing computer-executable instructions that, when executed on the one or more processors, perform a method for ranking results of a present database query, the method comprising:

accessing a specified attribute value from the present database query;

accessing one or more unspecified attribute values from a workload, wherein the workload includes attribute values associated with one or more previous database queries including the specified attribute value;

calculating a global atomic quantity for each of the one or more unspecified attribute values in a database, each global atomic quantity representing an unconditional importance level of its respective unspecified attribute value;

calculating a conditional atomic quantity for each of the one or more unspecified attribute values in the database, each conditional atomic quantity representing a conditional importance level of an association between each of the one or more unspecified attribute values and the specified attribute value; and ranking result tuples of the present database query based on the global atomic quantities and the conditional atomic quantities, wherein the ranking result tuples comprises:

calculating a conditional score for each tuple in the database;

calculating a global score for each tuple in the database; and using conditional scores and global scores, calculating a ranking score for each result tuple of the present database query that includes the specified attribute value;

wherein the calculating a conditional score comprises calculating a conditional score according to:

$$CondScore = \frac{\prod_{z \in t} p(x|z, W)}{\prod_{z \in t} p(x|z, D)};$$

and wherein the calculating a global score comprises calculating a global score according to:

$$GlobScore = \frac{\prod_{z \in t} p(z|W)}{\prod_{z \in t} p(z|D)}$$

wherein t is a tuple that contains a specified attribute value from the present database query, x is a specified attribute value from the present database query, z is an unspecified attribute value from the present database query, W is a workload of the database, and D is data in the database.

20. The system as recited in claim 19, wherein the calculating a global atomic quantity is selected from the group comprising:

calculating a database global atomic quantity that represents a frequency of occurrence of an unspecified attribute value within the database; and calculating a workload global atomic quantity that represents a frequency of occurrence of an unspecified attribute value within the workload.

21. The system as recited in claim 19, wherein the calculating a conditional atomic quantity is selected from the group comprising:

calculating a database conditional atomic quantity that represents a conditional importance level of an association between each of the one or more unspecified attribute values and the specified attribute value within the database; and calculating a workload conditional atomic quantity that represents a conditional importance level of an association between each of the one or more unspecified attribute values and the specified attribute value within the workload.

22. The system as recited in claim 10, wherein the one or more computer-readable storage media further store computer-executable instructions for:

building a conditional list of all tuples in the database and ordering tuples in the conditional list by descending conditional scores; and building a global list of all tuples in the database and ordering tuples in the global list by descending global scores.

23. The system as recited in claim 22, wherein calculating a ranking score for a result tuple comprises:

retrieving a conditional score for the result tuple from the conditional list;

retrieving a global score for the result tuple form the global list; and multiplying the global score and the conditional score.

24. The system as recited in claim 19, wherein the calculating a ranking score comprises calculating a ranking score according to:

$$Score(t) \propto \prod_{y \in Y} \frac{p(y|W)}{p(y|D)} \prod_{y \in Y} \prod_{x \in X} \frac{p(x|y, W)}{p(x|y, D)}.$$

25. The system as recited in claim 22, wherein the one or more computer-readable storage media further store computer-executable instructions for:

maintaining the conditional list and the global list in database tables; and enabling retrieval of tuples from the database tables through indexes in the database tables.

26. The system as recited in claim 25, wherein the enabling retrieval includes enabling retrieval of tuples one-by-one in order of decreasing score and enabling retrieval of tuples by random access.

27. The system as recited in claim 22, wherein:

building a conditional list comprises creating a conditional list table that includes an attribute name column, an attribute value column, a tuple identification column, and a conditional score column; and wherein building a global list comprises creating a global list table that includes an attribute name column, an attribute value column, a tuple identification column, and a global score column.

* * * * *